US007149209B2

(12) United States Patent
Strandberg

(10) Patent No.: US 7,149,209 B2
(45) Date of Patent: *Dec. 12, 2006

(54) SYSTEM AND METHOD FOR PROVIDING AUDIO COMMUNICATION OVER A COMPUTER NETWORK USING DIFFERING COMMUNICATION FORMATS

(75) Inventor: Malcom B. Strandberg, Cambridge, MA (US)

(73) Assignee: Aspect Software, Inc., Westford, MA (US)

( * ) Notice: Subject to any disclaimer, the term of this patent is extended or adjusted under 35 U.S.C. 154(b) by 282 days.

This patent is subject to a terminal disclaimer.

(21) Appl. No.: 10/818,764

(22) Filed: Apr. 6, 2004

(65) Prior Publication Data

US 2004/0193404 A1    Sep. 30, 2004

Related U.S. Application Data

(63) Continuation of application No. 09/244,446, filed on Feb. 4, 1999, now Pat. No. 6,760,323.

(51) Int. Cl.
*H04L 12/66* (2006.01)

(52) U.S. Cl. ...................... 370/352; 370/466
(58) Field of Classification Search ............... None
See application file for complete search history.

(56) References Cited

U.S. PATENT DOCUMENTS

| 5,132,992 | A | * | 7/1992 | Yurt et al. ................. 375/240 |
| 5,550,820 | A | * | 8/1996 | Baran ...................... 370/395.5 |
| 5,555,179 | A | | 9/1996 | Koyama .................... 700/95 |
| 5,765,033 | A | | 6/1998 | Miloslavsky ............... 709/206 |
| 5,867,494 | A | * | 2/1999 | Krishnaswamy et al. ... 370/352 |
| 5,892,764 | A | * | 4/1999 | Riemann et al. ........... 370/401 |
| 5,926,539 | A | | 7/1999 | Shtivelman ............ 379/266.01 |
| 5,946,387 | A | | 8/1999 | Miloslavsky ........... 379/265.12 |
| 5,953,332 | A | | 9/1999 | Miloslavsky ................ 370/352 |
| 5,953,405 | A | | 9/1999 | Miloslavsky ........... 379/265.01 |
| 6,002,760 | A | | 12/1999 | Gisby .................... 379/266.01 |
| 6,021,428 | A | | 2/2000 | Miloslavsky ............... 709/206 |
| 6,044,145 | A | | 3/2000 | Kelly et al. ............ 379/265.02 |
| 6,044,368 | A | | 3/2000 | Powers ......................... 707/2 |
| 6,067,357 | A | | 5/2000 | Kishinsky et al. ...... 379/265.02 |
| 6,108,711 | A | | 8/2000 | Beck et al. ................. 709/242 |
| 6,138,139 | A | | 10/2000 | Beck et al. ................. 709/202 |
| 6,167,395 | A | | 12/2000 | Beck et al. ................... 707/3 |
| 6,170,011 | B1 | | 1/2001 | Macleod Beck et al. ... 709/224 |
| 6,175,563 | B1 | | 1/2001 | Miloslavsky ................ 370/352 |
| 6,175,564 | B1 | | 1/2001 | Miloslavsky et al. ....... 370/352 |
| 6,185,292 | B1 | | 2/2001 | Miloslavsky ........... 379/265.01 |
| 6,240,074 | B1 | * | 5/2001 | Chandos et al. ............ 370/321 |
| 6,320,857 | B1 | * | 11/2001 | Tonnby et al. .............. 370/352 |
| 6,345,047 | B1 | * | 2/2002 | Regnier ..................... 370/352 |
| 6,345,305 | B1 | | 2/2002 | Beck et al. ................. 709/242 |
| 6,373,836 | B1 | | 4/2002 | Deryugin et al. ........... 370/352 |
| 6,389,007 | B1 | | 5/2002 | Shenkman et al. ......... 370/352 |
| 6,393,015 | B1 | | 5/2002 | Shtivelman ................ 370/352 |
| 6,427,005 | B1 | * | 7/2002 | Toyoda et al. ......... 379/100.08 |

(Continued)

*Primary Examiner*—Doris H. To
*Assistant Examiner*—Phuongchau Ba Nguyen
(74) *Attorney, Agent, or Firm*—Bourque and Associates

(57) ABSTRACT

A system and method for providing audio communication over a computer network between sending and destination devices using differing communication formats is provided. The system identifies the format of the incoming digital encoded audio data signal, identifies the destination device format of the signal, and converts the data to a second digital encoded audio data signal which is compatible with the format utilized by the destination device.

12 Claims, 3 Drawing Sheets

U.S. PATENT DOCUMENTS 6,584,122 B1 * 6/2003 Matthews et al. .......... 370/466
6,732,156 B1   5/2004 Miloslavsky ................ 709/206
6,760,323 B1 * 7/2004 Strandberg .................. 370/352

* cited by examiner

SYSTEM AND METHOD FOR PROVIDING AUDIO COMMUNICATION OVER A COMPUTER NETWORK USING DIFFERING COMMUNICATION FORMATS

CROSS-REFERENCE TO RELATED APPLICATIONS

This application is a continuation of co-pending U.S. patent application Ser. No. 09/244,446 filed on Feb. 4, 1999, now U.S. Pat. No. 6,760,323 entitled "SYSTEM AND METHOD FOR PROVIDING AUDIO COMMUNICATION OVER A COMPUTER NETWORK USING DIFFERING COMMUNICATION FORMATS".

FIELD OF THE INVENTION

This invention relates to audio communication systems and more particularly, to an audio communication system which will interface and convert one format of computer network transmittable audio data to another format.

BACKGROUND OF THE INVENTION

Until recently, almost all voice and fax communication between remote locations was carried over the public switched telephone network (PSTN). The PSTN provides a circuit switch signal path between two or more parties wishing to communicate with one another, that is, the signal path which is to be used exclusively by the parties is established and maintained throughout the communication. A party wishing to communicate with another having a compatible device, whether by voice, fax, or data, dials the appropriate telephone number and the PSTN will connect the two parties, or two fax machines, or two data terminals, by creating a dedicated, continuous, signal path between the parties. Thus, the parties have a continuous two-way communication link established between them for the duration of their usage.

In the last decade, large scale high speed computer networks have been developed which utilize packet switching technologies. A packet switched network is entirely different than the circuit switched PSTN. A packet switched network is one in which discrete packets of data are routed, as required, between users. Thus, a packet switched network is one which connects two parties wishing to communicate only when there is data to transmit between those two parties.

An example of a packet switched network is the Internet-World Wide Web. The Internet-World Wide Web packet switched network may be accessed by a user through an "internet provider" via a local phone connection, across the circuit switched PSTN. Alternatively, users at schools or corporations can access the internet directly via network cards in a PC or workstation. Once connected to the Internet-World Wide Web, a user may send data to any other user having access to this network. This connectivity appears to be a local telephone call to the local phone company, even though the other party may be located across town, across the state, across the country, or across the world.

Although the packet switched networks were originally developed to transmit data and text in a digital format, technology has progressed to allow packets of data containing digitized voice or audio signals to be passed through the network to establish voice or audio communication between different users. Although the audio quality is not as high as with the PSTN, this method of audio communication may, nonetheless, be extremely advantageous in terms of the cost per call, since each call will appear to each user to be a local telephone call, regardless of where the other party is located. Additionally, improvements in technology are constantly increasing audio quality.

Several companies have developed their own proprietary systems which allow users to transmit audio information over the Internet-World Wide Web. The disadvantage of the current state of the art of these packet switched voice or audio systems is that in general, one system is not compatible with another. Thus, two parties wishing to exchange audio data across a packet switched computer network, such as the Internet-World Wide Web, must be using the same packet switched voice communication package, or else no communication between the two parties will be possible. Also, some of the new audio compression algorithms can only be processed by fast (pentium) processors. If connecting to a slower PC, a less effective compression algorithm must be used, resulting in an inability to exchange compressed audio data between systems having different processor speeds. A translation system can be located at a corporate site, thus allowing conversions to easier compression rates at a company's local network. Another disadvantage of the current state of the art of these systems is that in general, they are not compatible with the PSTN. Thus, it is not currently possible for a party utilizing one of these systems providing audio communication over a packet switched data network to communicate with a telephone connected to the PSTN.

Accordingly, what is needed is a system and method for providing an ability to translate from one packet switched voice communication system to another different packet switched voice communication system in order to allow users previously unable to exchange audio data to now communicate over a computer network. In addition, what is needed is a system and method for providing an interface between a packet switched voice system, such as the Internet-World Wide Web, and the PSTN. This would enable users on the Internet-World Wide Web to communicate with a standard telephone user connected to the PSTN.

SUMMARY

The present invention provides a system and method for providing audio communications over a computer network using differing communication formats. In one embodiment, the system receives a first digital encoded audio data signal, which is encoded in a first data format. The system will first strip out the data format identification portion and the destination address from the first digital encoded audio data signal. The system will then generate and send a destination signal to an interface/controller. Based on the received destination address, the system will determine a required destination audio data format, either by having a single, known required destination audio data format or using a look-up table, which would correlate a plurality of destination addresses with their respective required audio data formats. Having determined the first digital encoded audio data signal format and the destination digital encoded audio data signal format, the system will then generate and send a translation signal to a signal translator.

The system will also transfer the data to the translator, in its first data format. The translator, in response to the translation signal, will then translate the first digital encoded audio data signal into a second digital encoded audio data signal utilizing a second digital encoded audio data signal format, which will be acceptable to the destination device.

The system will appropriately route the signal to the proper destination based on the destination address. The data may be transferred over the public switched telephone network, a computer network such as a local area network, wide area network, intranet, the Internet or World Wide Web, or any other TCP/IP network.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
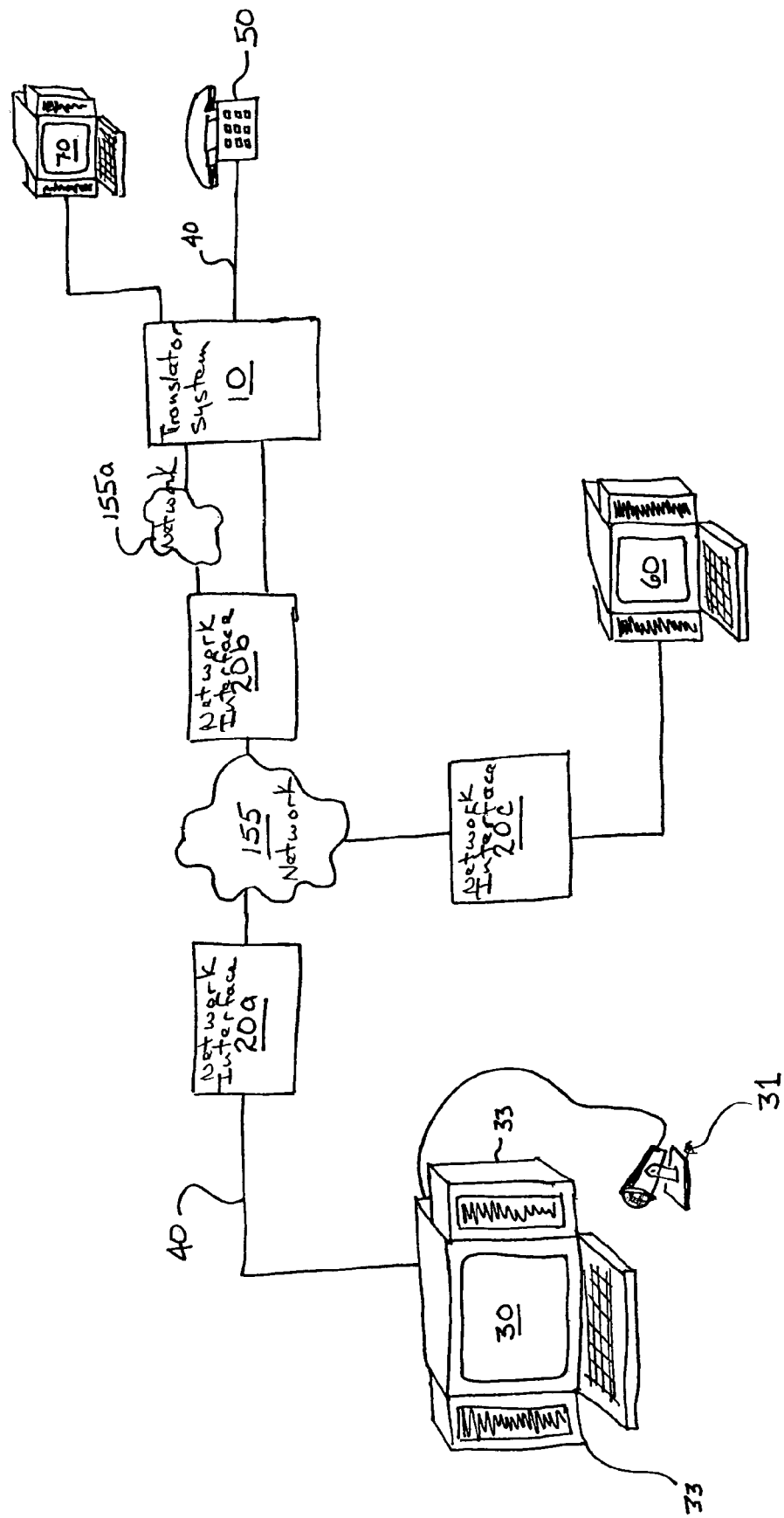
FIG. 1 is a schematic block diagram of the audio communication system of the present invention.

FIG. 1 shows a system for providing audio communication over a computer network between sending and receiving devices using differing communication formats, according to the present invention. The system 10 interfaces with a first audio transceiver device 30, typically having a connection to the public switched telephone network (PSTN) 40, although different types of connections are contemplated. The first audio transceiver device 30 may be, for example, a personal computer with an audio input/output capability such as a headset or microphone 31 and speakers 33, a modem standard telephone line or an Integrated Services Digital Network (ISDN) line.

The PSTN 40 connects the first audio transceiver device 30 to a first computer network interface 20a, if necessary, which interfaces the first audio transceiver device 30 to a computer network 155. The computer network 155 may be, for example, the global computer network known as the internet or any other local area network (LAN) or wide area network (WAN). In the example that utilizes the internet as the computer network, the first computer network interface 20a receives a wide area network (WAN) internet protocol (IP) signal, such as point-to-point protocol (PPP), and connects the WAN IP signal to the internet TCP/IP network.

Typically, the first transceiver device 30 receives audio signals, such as from microphone 31, and, based on the audio communication software being run, converts the audio signals to a first digital encoded audio data signal having a first data format based specifically on the audio communication software being used. In one example, the data format is a protocol packet compression from a raw audio stream according to a compression algorithm. Examples of audio communication software include Cooltalk, CUSeeMe, Net-Meeting, Webtalk, and Freely Speaking.

If the first transceiver device 30 is coupled to a transmission line, such as PSTN 40, the first digital encoded audio data signal will be a serial WAN IP signal, which will be converted to TCP/IP network protocol by computer network interface 20a. The computer network 155 is typically the Internet or World Wide Web, although any local area network, intranet, or wide area network, is considered to be an equivalent computer network.

The computer network 155 is then coupled to the digital encoded audio signal translator system 10 via a second computer network interface 20b either directly or via a second computer network 155a. The digital encoded audio data signal translator system 10 will first identify the data format of the received digital encoded audio data signal in the manner discussed below. It will then identify the desired destination of the received digital encoded audio data signal and identify a destination audio data signal format, which is acceptable to the desired destination device. The digital encoded audio data signal translator system 10 will then translate the received digital encoded audio data signal into a destination audio data signal, which utilizes the destination audio data signal format. Finally, the digital encoded audio data signal protocol translator system 10 will transmit the destination audio data signal to the desired destination device.

The desired destination device may include a standard telephone 50, in which case the digital encoded audio data signal translator 10 will translate the received digital encoded audio data signal into an analog destination signal for transmission over the PSTN 40. On the other hand, if the desired destination device is a local digital voice communication system 70, the digital encoded audio signal translator 10 will translate the received digital encoded audio data signal into a digital encoded destination audio data signal in a format compatible with the local digital voice communication system 70. For example, a telemarketing organization may have several computer terminals capable of converting a particular digital encoded audio data signal to an audio output and an audio input to a particular digital encoded audio data signal. In this case, the digital encoded audio data signal translator 10 may serve several second audio transceiver devices and be connected to the second audio transceiver devices via a company LAN, WAN, or Internet.

As a third option, the digital encoded audio signal translator system 10 may reformat the received digital encoded audio data signal into a digital encoded destination audio data signal, which it would re-address and transmit to a remote destination device 60 via the second computer network interface 20b, the Internet, World Wide Web 155 and a third computer network interface 20c.

Figure 2:
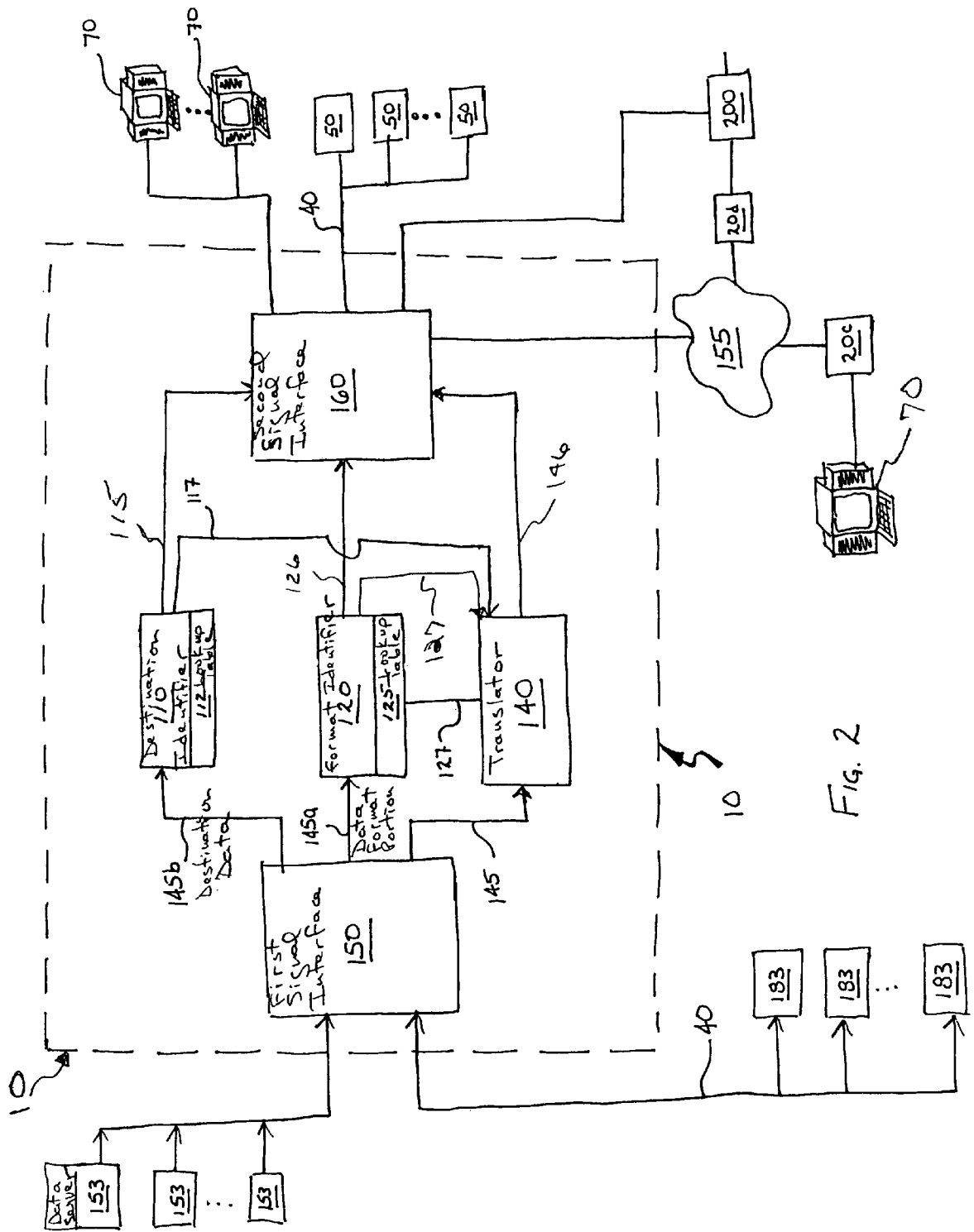
FIG. 2 is a schematic block diagram of a digital encoded audio signal protocol translator in the audio communication system, according to one embodiment of the present invention.

Referring now to FIG. 2, the digital encoded audio data signal translator system 10 of the present invention comprises a first digital audio signal interface 150, which may receive data either digitally from a data server 153 or in analog form from standard telephone sets 183 over the PSTN 40. The data server 153 is typically a computer network interface which will interface the first digital audio signal interface 150 to a computer network such as the Internet or World Wide Web. It is understood by one skilled in the art that other forms of computer networks may be used instead of the Internet or World Wide Web. These networks include but are not limited to local area networks (LAN), wide area networks (WAN), company intranet networks, or other TCP/IP networks.

The first digital audio signal interface 150 may also have an analog audio input to receive audio data from standard telephones. Typically there would be a private branch exchange (PBX)(not shown) interfacing the first digital audio signal interface 150 to the PSTN 40, although it is conceivable to one skilled in the art that a direct dial-in line would be available.

The first digital audio signal interface 150 receives the data, either analog audio or digital, and will first identify the data format used by the sending audio transceiver device. By data format, we mean both a data protocol as a standard way of relaying data transmission between computers and also a data format, i.e., a method of arranging data for transmission between computers, such as data compression formats according to different types of compression algorithms. It will be seen by one of ordinary skill in the art that a protocol may require a particular data compression format or that a particular data format may also include a particular data protocol.

The first digital audio signal interface 150, will identify the data format of the received data signal and provide a digital encoded audio data signal format identification portion 145*a* to the format identifier 120. The first digital audio signal interface 150 will also identify the destination portion of the incoming data 145*b*. The first digital audio signal interface 150 will then provide the destination identification portion 145*b* of the incoming data to the destination identifier 110. The destination identifier 110 will then generate a destination identification signal 115, which it will provide to a second digital audio signal interface and controller 160, such as a PBX. The destination identifier 110 may also contain a look-up table 112, which will correlate destination devices with their required destination signal formats. Based on the look-up table, the destination identifier 110 will also generate a destination format signal 117, which represents a data format that is compatible with the desired destination device. The destination format signal 117 is provided to the translator 140.

The format identifier 120 also contains a look-up table 125, which will receive as its input, the digital encoded audio data signal format identification portion 145*a* of the received audio data signal. The format identifier 120 accesses its look-up table 125 and identifies and generates a format identification signal 126 and format translation signal 127. The format identification signal 126 is provided to the second digital audio signal interface and controller 160, while the format translation signal 127 is provided to the translator 140.

The first digital audio signal interface 150 also sends the entire first digital encoded audio data signal 145 to the translator 140. Based on the received format translation signal 127 and the received destination format signal 117, the translator 140 then converts and/or translates the data from the received audio data signal format to the destination audio data signal format and transfers the translated data 146 to the second digital audio signal interface and controller 160. For example, the translator 140 can translate audio data compressed using one type of compression algorithm to audio data compressed with another type of compression algorithm that can be processed at the processor speed of the destination computer 170.

The second digital audio signal interface and controller 160 will then utilize the destination identification signal 115, the format identification signal 126, and the translated destination data signal 146 from the translator, and determine the appropriate routing and control signals required for proper delivery of the data to the desired destination device 50,70.

Data delivery may involve the transmission of the translated audio data 146 to a local second audio transceiver device, which may include a computer 70 with a particular digital audio communication package installed on it. In this case, the second digital audio signal interface 160 would transmit the translated audio data 146 directly to the receiving device.

In the alternative, the translated audio data 146, may be transmitted, in its translated, digital format, over a computer network 155, such as the Internet or World Wide Web to a remote destination device, such as remote computer 70, which accesses computer network 155 via data interface 20*c*.

In addition, the second digital audio signal interface 160 may itself convert the translated digital audio data signal 146 to a translated analog audio data signal 146*a*, which it could transmit via the PSTN 40 to a standard telephone 50.

Finally, the translated digital audio data 146 may be transmitted by the second digital audio signal interface 160 to one or more remote data server 200, which would further route the translated audio data signal to a specific destination device (not shown). The remote data server(s) may be connected to the second digital audio signal interface 160 using either a dedicated data connection 202 or using the Internet 155 via a fourth data interface 20 (*d*).

Figure 3:
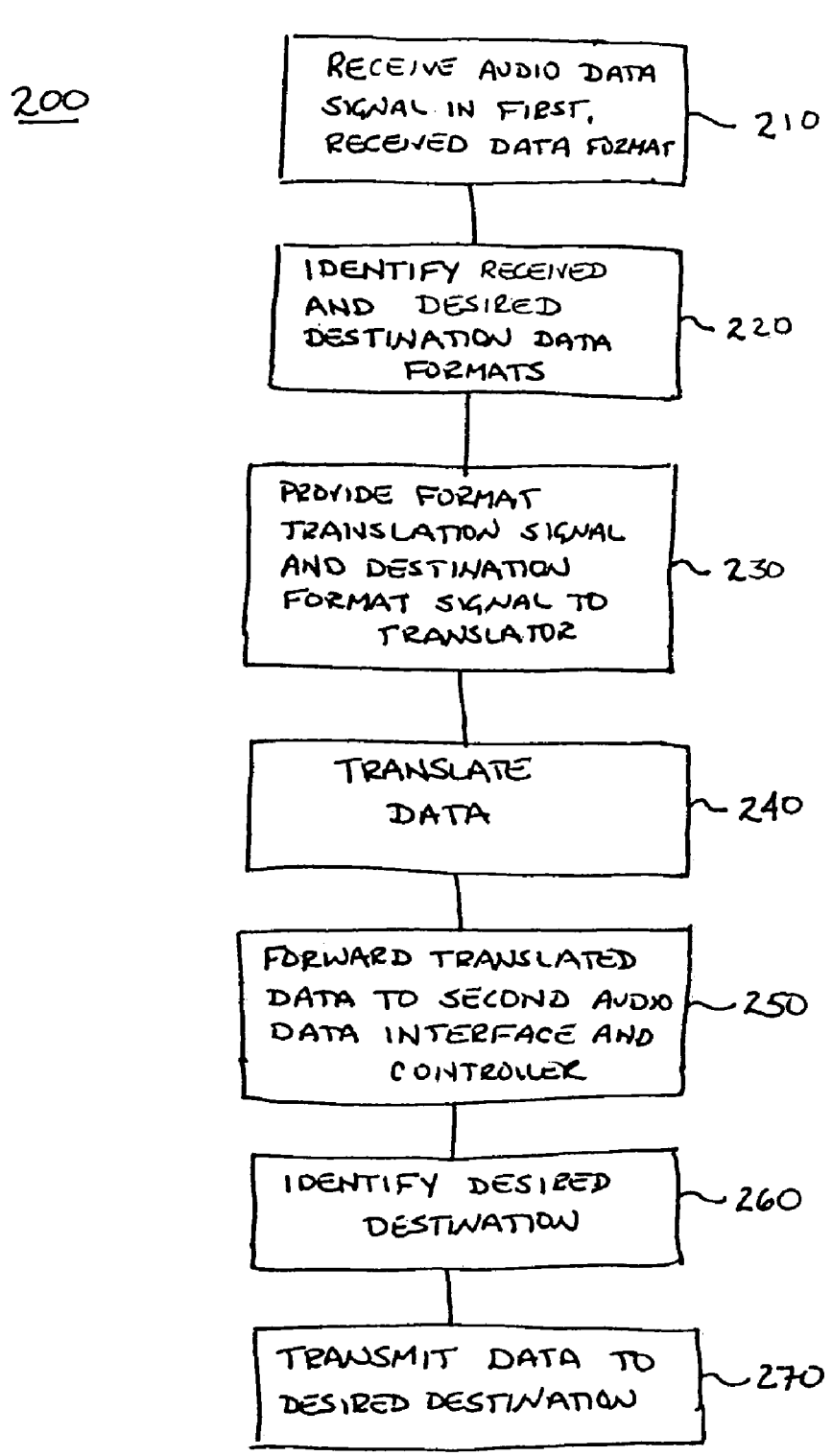
FIG. 3 is a flow chart showing the audio communication method according to the present invention.

FIG. 3 provides a flowchart of a method 200 of providing audio communication over a computer network using differing communication formats, according to the present invention. The first step is to receive digitized audio data, at a first digital audio signal interface, step 210. The received digitized audio data utilizes a first digital encoded audio data signal format. The received audio data signal includes at least a destination identification portion 145*b* and a format identification portion 145*a*. Since a principle object of the present invention is to provide a system and method of translating audio data, it is assumed that the desired destination device will utilize a second digital encoded audio data signal format, which is different from the first. Therefore, the next step is to identify the first, received audio signal format and the second, destination audio signal format, step 220. While the received audio signal format can be readily determined from the received identification portion of the received signal, it will be appreciated that in order to properly translate the received audio data signal into a format that is compatible with the desired destination device, the destination data format must be either known or determined.

There are several methods by which the destination data format may be known or determined. For example, the destination device may be co-located with the second digital audio signal interface and controller/PBX 160 (FIG. 2). This would be the case at, for example, at a telemarketing firm. At a telemarketing firm that utilizes the present invention it is clear that all of the destination devices will share a common destination data format. Thus, in this scenario, the destination data format will be known and the problem of identifying the destination protocol will not exist.

In another example, customers may subscribe or join a service for receiving audio communications across a computer network. In this example, the customers would need to supply the appropriate audio data signal format required by their system for proper translation thereof to the service provider as part of the subscription process. The appropriate destination data format would then be stored, for example in the look-up table 125 (FIG. 2) at a format identifier maintained by the service provider.

In a third example, the second digital audio signal interface and controller 160 (FIG. 2) would poll the destination device in order to determine the destination format. This could be accomplished by simply providing a query requiring the transmission of a simple digitized audio or other signal as its response. Since the signal response, like the original received audio data signal, will also have a format identification portion, the task of identifying the destination audio data format is not difficult.

In any event, once the received audio data format and the destination audio data format are known, the format identifier and destination identifier will provide the proper format translation signal and destination format signal, respectively to the format translator, step 230. In the next step, step 240, the format translator translates the received audio data signal into the desired destination format.

The translated audio data signal is then forwarded to a second audio signal interface, step 250. In addition to receiving the translated audio data signal, the second audio signal interface receives the destination identification signal from the destination identifier to identify the desired destination of the translated audio data signal, step 260. Finally, the translated audio data is transmitted to the desired destination by the second audio data interface, step 270.

The second audio signal interface and controller is also responsible for generating the appropriate control signals to route the translated audio data to its desired destination. For example, to send an audio signal via the PSTN, the second digital audio signal interface must generate the necessary dual tone multiple frequency (DTMF) tones to dial the number. In another example, the second digital audio signal interface and controller/PBX will generate control signals for a modem in order to establish and internet, World Wide Web connection. In a third example, the second digital audio signal interface and controller/PBX would generate the DTMF tones necessary to establish an ISDN connection.

Accordingly, the present invention provides a novel system and method for providing audio communication over a computer network between sending and destination devices utilizing differing audio data formats.

Modifications and substitutions by one of ordinary skill in the art are considered to be within the scope of the present invention, which is not to be limited except by the following claims.

The invention claimed is:

1. A method of providing audio communications over a computer network between sending and destination audio transceiver devices respectively coupled to one or more transmission networks, said transceiver devices utilizing differing first and second digital encoded audio signal formats, respectively, said method comprising the steps of:
   receiving digitized audio data transmitted by said sending audio transceiver device at a single first digital audio data signal interface, said received digitized audio data signal utilizing said first audio data signal format;
   identifying at least a destination identification portion and a format identification portion of said received digitized audio data signal;
   identifying said first and second audio data signal formats;
   responsive to said step of identifying at least said second audio data signal formats, providing a format translation signal to a format translator; and
   responsive to said format translation signal, translating said first digital encoded audio data signal at a single translator to a second digital encoded audio data signal having said second audio data signal format, irrespective of which transmission networks the sending and destination audio transceiver devices are coupled to.

2. The method claimed in claim 1, wherein said step of identifying said second audio data signal format comprises the steps of:
   providing a plurality of destination audio data signal formats to a format identifier;
   storing in a look-up table at a destination identifier said destination audio data signal formats at least one destination audio data signal format corresponding to at least one destination device;
   searching said look-up table in response to a received destination identification signal and retrieving said at least one destination format corresponding to said destination device; and
   providing said destination identification signal to said format translator.

3. The method claimed in claim 1, wherein said step of identifying said second audio data signal format comprises:
   polling said destination device to receive an audio signal response;
   identifying a format identification portion of said audio signal response;
   searching a look-up table to identify a destination format identification signal corresponding to said format identification portion of said audio signal response; and
   providing said destination format identification signal to said format translator.

4. A method of communicating between a first and at least a second audio transceiver device comprising the acts of:
   transmitting a first audio signal in a first audio format from said first audio transceiver device to a first translator;
   transmitting a second audio signal in a second audio format from said first translator to said at least a second audio transceiver device, said second audio format being different than said first audio format;
   identifying a first destination identifier corresponding to said at least a second audio transceiver device;
   identifying a first format identifier corresponding to said first audio format of said first audio signal;
   identifying a second format identifier corresponding to said second audio format;
   responsive to said act of identifying said second format identifier and said act of identifying said first format identifier, translating said first audio signal having said first audio format to said second audio signal having said second audio format at said first translator regardless of a transmission line upon which said first audio signal is received and regardless of said first audio format such that all translations are performed at said first translator.

5. The method as claimed in claim 4 further including the act of polling said at least a second audio transceiver device to determine at least one acceptable second audio format.

6. The method as claimed in claim 4 wherein said act of identifying said second audio format is responsive to a database comprising one or more audio formats corresponding to at least said second audio transceiver device.

7. The method as claimed in claim 4 wherein said second audio format is predetermined and said first audio format is not predetermined.

8. The method as claimed in claim 4 further including identifying a second destination identifier corresponding to said first audio transceiver device.

9. The method as claimed in claim 8 wherein said act of identifying said first format identifier corresponding to said first audio format of said first audio signal is responsive to said act of identifying said second destination identifier corresponding to said first audio transceiver device.

10. The method as claimed in claim 4 wherein said act of identifying said second format identifier corresponding to said second audio format of said at least a second audio transceiver device is responsive to said act of identifying said first destination identifier corresponding to said second audio transceiver device.

11. The method as claimed in claim 4 further including the act of storing in an audio format database at least one audio format corresponding to each of a plurality of destination audio transceiver devices, said plurality a destination audio transceiver devices including at least said first and said at least a second audio transceiver devices.

12. The method as claimed in claim 11 wherein said act of identifying said second format identifier corresponding to said second audio format further includes searching said audio format database.

* * * * *